US011036232B2

(12) United States Patent
Shkurti et al.

(10) Patent No.: US 11,036,232 B2
(45) Date of Patent: Jun. 15, 2021

(54) ITERATIVE GENERATION OF ADVERSARIAL SCENARIOS (71) Applicants: Florian Shkurti, Montreal (CA); Gregory Dudek, Westmount (CA); Yasasa Abeysirigoonawardena, Montreal (CA); Elmira Amirloo Abolfathi, North York (CA); Jun Luo, Toronto (CA)

(72) Inventors: Florian Shkurti, Montreal (CA); Gregory Dudek, Westmount (CA); Yasasa Abeysirigoonawardena, Montreal (CA); Elmira Amirloo Abolfathi, North York (CA); Jun Luo, Toronto (CA)

(73) Assignees: HUAWEI TECHNOLOGIES CO., LTD, Shenzhen (CN); THE ROYAL INSTITUTION FOR THE ADVANCEMENT OF LEARNING/MCGILL UNIVERSITY, Montreal (CA)

( * ) Notice: Subject to any disclaimer, the term of this patent is extended or adjusted under 35 U.S.C. 154(b) by 178 days.

(21) Appl. No.: 16/297,973

(22) Filed: Mar. 11, 2019

(65) Prior Publication Data
US 2020/0089247 A1 Mar. 19, 2020

Related U.S. Application Data (60) Provisional application No. 62/731,473, filed on Sep. 14, 2018.

(51) Int. Cl.
G05D 1/02 (2020.01)
G06N 20/00 (2019.01)
G05D 1/00 (2006.01)

(52) U.S. Cl.
CPC .......... *G05D 1/0221* (2013.01); *G05D 1/0088* (2013.01); *G05D 1/0246* (2013.01);
(Continued)

(58) Field of Classification Search
CPC .. G05D 1/0221; G05D 1/0088; G05D 1/0246; G05D 1/0257; G05D 1/0278; G05D 2201/0213; G06N 20/00
(Continued)

(56) References Cited

U.S. PATENT DOCUMENTS 10,019,011 B1 7/2018 Green et al.
2016/0314224 A1 10/2016 Wei et al.
2020/0090074 A1* 3/2020 Isele ...................... G06N 7/005

FOREIGN PATENT DOCUMENTS

CN 107134006 A 9/2017
EP 3211565 A2 8/2017

* cited by examiner

*Primary Examiner* — Gertrude Arthur Jeanglaude (57) ABSTRACT

A method and apparatus for generating adversarial scenarios and training an autonomous driving agent for an autonomous vehicle, using one or more sets of parameters, each set of parameters defining a respective driving scenario. A new set of parameters is generated by changing one or more parameters of one of the sets of parameters to define a new driving scenario, and performance of the autonomous driving agent is evaluated on the new driving scenario. The generating and evaluating is repeated until the autonomous driving agent fails to satisfy a predefined performance threshold for the new driving scenario. Each instance of changing the one or more parameters is based on a prior evaluated performance of the autonomous driving agent. The autonomous driving agent is trained to update a learned policy of the autonomous driving agent using at least one set of parameters, including the new set of parameters.

20 Claims, 9 Drawing Sheets (52) U.S. Cl.
CPC ......... *G05D 1/0257* (2013.01); *G05D 1/0278* (2013.01); *G06N 20/00* (2019.01); *G05D 2201/0213* (2013.01)

(58) Field of Classification Search
USPC .......................................................... 701/27
See application file for complete search history.

Generate
Scenario Fn
322

GENERATE_SCENARIO(num_vehicles, change_lane_frequency, speed_y, change_lane_threshold, vertical_distance_threshold, change_lane_threshold, lane_width, number_of_lanes):
DO i=1:num_vehicles:
    vehicle = get_or_create_vehicle(i) # simulator function for adding vehicle to the traffic or getting the vehicles that are already created
    IF t% change_lane_frequency == 0:
        Target_lane_id = clip(random.choice([-1, 0, 1]) + agent_lane_id, low=0, high=number_of_lanes)
        IF distance to car behind in target lane > change_lane_threshold:

ELSE:

ENDIF
    ELSE:

ENDIF
    IF distance to front car < vertical_distance_threshold:

ELSE

ENDIF
    vehicle.set_position()

ADA training function
324 function train_agent(agent, env)
  DO i to training_steps:
      action = RL_agent.act(states)
    new_state, reward, done = env.step(action)
      RL_agent.optimize(state, new_state, reward, done)
    rewards, dones = collect(rewards, done)
  END DO
  performance = evaluate(rewards, dones)
  RETURN performance ADA evaluation function
326 function eval_agent(agent, env)
  DO i to eval_steps:
      action = RL_agent.act(states)
    new_state, reward, done = env.step(action)
      rewards, dones = collect(rewards, done)
  performance = evaluate(rewards, dones)
  END DO
  RETURN performance

FIG. 7

GENERATE_ADVERSARIAL_EXAMPLES(env, agent, performance, parameters):
  new_parameters = $f_\theta(parameters, performance)$
  GENERATE_SCENARIO(new_parameters)
  New_performance = eval_agent(env, agent)
  MINIMIZE COST_FUNCTION(performance, new_performance) w.r.t. $\theta$
  Return new_performance, new_parameters Generate Adverse Scenario 328

ITERATIVE GENERATION OF ADVERSARIAL SCENARIOS

CROSS-REFERENCE TO RELATED APPLICATIONS

The present disclosure claims priority from U.S. provisional patent application no. 62/731,473, filed Sep. 14, 2018, entitled "ITERATIVE GENERATION ADVERSARIAL SCENARIOS", the entirety of which is hereby incorporated by reference

FIELD

The present disclosure relates to systems and methods for generating scenarios for autonomous driving agents.

BACKGROUND

Autonomous driving has received major attention in recent years. An autonomous vehicle may use different sensors to sense its surrounding environment and vehicle operating parameters. The autonomous vehicle may also include an autonomous driving agent to process the sensed environment and vehicle operating parameters to determine a state of the vehicle; select actions based on the state of the vehicle, a learned policy of the autonomous driving agent, and a target objective; and to output the selected actions to a vehicle controller. The vehicle controller determines control commands corresponding to the selected actions and outputs the control commands to an electromechanical system. The electromechanical system implements the control commands to achieve the target objective. When an autonomous vehicle is used in real world environments it is crucial that the autonomous driving agent selects an action that causes the autonomous vehicle to operate in a safe and robust manner when performing the action as failure to operate in a safe and robust manner may lead to fatal accidents. Hence, autonomous driving agents need to be tested under various environmental conditions (e.g. daytime, night-time, rainy, snowy, etc.) in different scenarios (e.g. highway driving, low traffic urban area driving, etc.). However, generating a robust set of evaluation scenarios, an in particular evaluation scenarios that are sufficiently adverse to cause an autonomous driving agent to fail, is not a trivial task.

Currently there are two major directions for generating evaluation scenarios for autonomous driving agents. One option is to manually define scenarios with different levels of difficulty. For example driving in low-traffic highway during a sunny day may be considered as an easy scenario while driving in a crowded urban area in a rainy day can be classified as a difficult scenario. Another option is to use generative models for generating simulated scenarios with different levels of difficulty. For example, generative models can be suitable for generating scenarios that rely on high dimensional data like images and point clouds. Generative models can be used to generate a variety of evaluation and training scenarios.

However, even with current generative models it can be difficult to generate adversarial scenarios that can be used to suitably test an autonomous vehicle agent.

Accordingly, a system and method for generating adversarial scenarios for autonomous driving agents is desired.

SUMMARY

A system and method are described for generating adversarial scenarios for evaluating an autonomous driving agent. In described examples, the generation of adversarial scenarios is based on the history of the autonomous driving agent's past performance in respect of prior adversarial scenarios. In one example aspect, a method and system for generating adversarial scenarios and training an autonomous driving agent uses a scenario to improve performance of an autonomous driving agent; progressively changes selected parameters that define the scenario until the autonomous driving agent cannot satisfactorily perform in the scenario defined by the changed parameters; and then uses the scenario defined by the changed parameters to improve the autonomous driving agent.

In some aspects, the present disclosure describes a method for training an autonomous driving agent for an autonomous vehicle using one or more sets of parameters, each set of parameters defining a respective driving scenario for the autonomous vehicle. The method includes: generating a new set of parameters by changing one or more parameters of one of the sets of parameters to define a new driving scenario, and evaluating performance of the autonomous driving agent on the new driving scenario; repeating the generating and evaluating until the autonomous driving agent fails to satisfy a predefined performance threshold for the new driving scenario, wherein each instance of changing the one or more parameters is based on a prior evaluated performance of the autonomous driving agent; and training the autonomous driving agent to update a learned policy of the autonomous driving agent using at least one set of parameters, including the new set of parameters.

In any of the above, the one or more sets of parameters may be stored in a database. The method may include: after the repeating, storing the new set of parameters including the one or more changed parameters in the database.

In any of the above, the autonomous driving agent may be pre-trained using a sample of the one or more sets of parameters, prior to generating the new set of parameters.

In any of the above, the autonomous driving agent may use machine learning, and the at least one set of parameters is used as a training dataset for training the autonomous driving agent.

In any of the above, changing the one or more parameters may include changing the one or more parameters based on one or more predefined constraints.

In any of the above, at least one of the one or more constraints may be applied using a predefined rule or a constrained optimization algorithm.

In any of the above, changing the one or more parameters may include: determining a gradient representing how a given change of a given parameter affects performance of the autonomous driving agent; and based on the gradient, changing the given parameter in a direction expected to challenge the autonomous driving agent.

In any of the above, changing the one or more parameters may include: changing at least one parameter using an optimization algorithm in order to challenge the autonomous driving agent.

In some aspects, the present disclosure describes a processing unit that includes: a processor; and a memory coupled to the processor, the memory storing machine-executable instructions of an autonomous driving agent for an autonomous vehicle that, when executed by the processing unit, causes the processing unit to: generate a new set of parameters by changing one or more parameters of a set of parameters defining a respective driving scenario for the autonomous vehicle to define a new driving scenario for the autonomous vehicle, and evaluate performance of the autonomous driving agent on the new driving scenario;

repeat the generate and evaluate until the autonomous driving agent fails to satisfy a predefined performance threshold for the new driving scenario, wherein each instance of changing the one or more parameters is based on a prior evaluated performance of the autonomous driving agent; and train the autonomous driving agent to learn a policy of the autonomous driving agent using at least one set of parameters, including the new set of parameters.

In any of the above, the one or more sets of parameters may be stored in a database. The instructions may further cause the processing unit to: after the repeating, store the new set of parameters including the one or more changed parameters in the database.

In any of the above, the autonomous driving agent may be pre-trained using a sample of the one or more sets of parameters, prior to generating the new set of parameters.

In any of the above, the autonomous driving agent may use machine learning, and the at least one set of parameters may be used as a training dataset for training the autonomous driving agent.

In any of the above, the instructions may further cause the processing unit to change the one or more parameters by changing the one or more parameters based on one or more predefined constraints.

In any of the above, at least one of the one or more constraints may be applied using a predefined rule or a constrained optimization algorithm.

In any of the above, the instructions may further cause the processing unit to change the one or more parameters by: determining a gradient representing how a given change of a given parameter affects performance of the autonomous driving agent; and based on the gradient, changing the given parameter in a direction expected to challenge the autonomous driving agent.

In any of the above, the instructions may further cause the processing unit to change the one or more parameters by: changing at least one parameter using an optimization algorithm in order to challenge the autonomous driving agent.

In any of the above, the processing unit may be implemented in the autonomous vehicle, and the instructions may further cause the processing unit to implement the autonomous driving agent in the autonomous vehicle.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Some examples of the present disclosure are described in the context of autonomous vehicles. Although examples described herein may refer to a car as the autonomous vehicle, the teachings of the present disclosure may be implemented in other forms of autonomous or semi-autonomous vehicles including, for example, trams, subways, trucks, buses, surface and submersible watercraft and ships, aircraft, drones (also called unmanned aerial vehicles (UAVs)), warehouse equipment, manufacturing facility equipment, construction equipment, farm equipment, autonomous service robots such as vacuum cleaners and lawn mowers, and other robotic devices. Autonomous vehicles may include vehicles that do not carry passengers as well as vehicles that do carry passengers.

Figure 1:
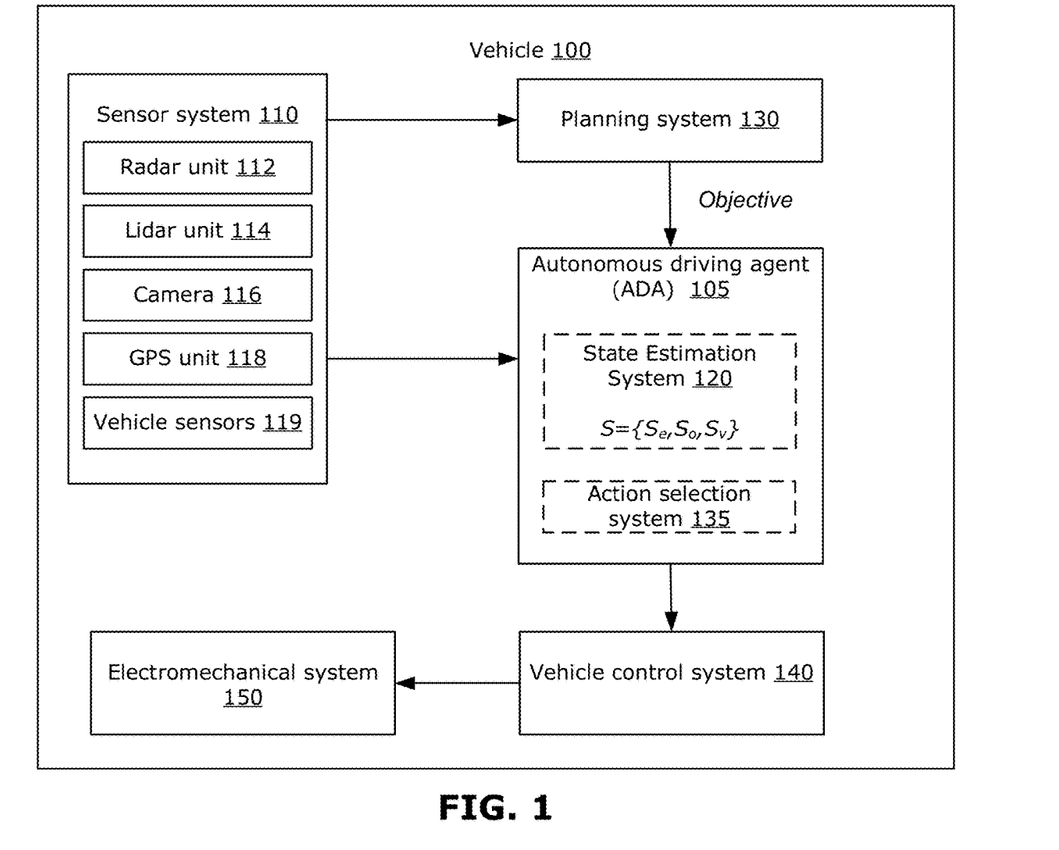
FIG. 1 is a block diagram illustrating some components of an example autonomous vehicle.

FIG. 1 is a block diagram illustrating certain components of an example autonomous vehicle 100. Although described as being autonomous, the vehicle 100 may be operable in a fully-autonomous, semi-autonomous or fully user-controlled mode. In the present disclosure, the vehicle 100 is described in the embodiment of a car, however the present disclosure may be implemented in other vehicles, as discussed above.

The vehicle 100 includes a sensor system 110, an autonomous driving agent (ADA) 105, a planning system 130, a vehicle control system 140, and an electromechanical system 150, for example. Other systems and components may be included in the vehicle 100 as appropriate. The systems and components of the vehicle, including sensor system 110, autonomous driving agent 105, the planning system 130, the vehicle control system 140 and the electromechanical system 150 may communicate with each other, for example through wired or wireless communication. The ADA 105, the planning system 130, and the vehicle control system 140 in this example are distinct software systems that may be implemented on one or more chips (e.g., application-specific integrated circuit (ASIC), field-programmable gate array (FGPA), and/or other types of chip). For example, the ADA 105, the planning system 130, and the vehicle control system 140 may be implemented using one chip, two chips, or three distinct chips (using the same or different types of chips). FIG. 1 illustrates an example flow of data (indicated by arrows) from the sensor system 110 to the planning system 130 and the ADA 105, from the planning system 130 to the ADA 105, from the ADA 105 to the vehicle control system 140, and from the vehicle control system 140 to the electromechanical system 150 (discussed in further detail below). However, it should be understood that data may be communicated among the systems 105, 110, 130, 140, 150 in various different ways, and there may be two-way data communication among the systems 105, 110, 130, 140, 150.

The sensor system 110 includes various sensing units for collecting information about the vehicle 100 and the environment the vehicle 100 operates in, for use by the ADA 105. The ADA 105 receives a target objective from the planning system 130 of the vehicle 100 and selects one or more actions to be performed by the vehicle 100 based on the sensor data, which is representative of the collected information received from the sensor system 110, and the target objective. The one or more selected actions are provided to the vehicle control system 140 which determines a command corresponding to each action received from the ADA 105. The vehicle control system 140 provides control signals corresponding to each action to the electromechanical system 150 which implements the respective control signals to cause the vehicle 100 to perform the selected action.

In example embodiments, the sensor system 110 includes an array of sensing units that collect information about the vehicle 100 and the environment the vehicle 100 operates in and provides sensor data representative of the collected information to the planning system 130 to enable the planning system 130 to generate a driving plan for the vehicle 100 and to the ADA 105 to enable the ADA 105 to determine a real-time state S of the vehicle 100. The vehicle state S can include state information in the following categories, for example: (1) vehicle environment ($S_e$), which includes ambient aspects and features of the space that the vehicle operates in, including for example: road layout (e.g. roads, road lanes, lane boundaries, intersections); presence of stationary objects and characteristics of those object (e.g. curbs, road barriers, traffic signs, traffic lights; road conditions (e.g. wet, dry, icy); ambient lighting conditions (e.g. light, dark); weather conditions (e.g. sunny, raining, snowing, overcast) and temperature; (2) other moving objects ($S_o$), which includes information about other moving objects within a detectable range of the vehicle (e.g. other motorized vehicles, bicycles, pedestrians, animals); and (3) vehicle physical state ($S_v$) which includes information about the actual vehicle including positional information (e.g. a location of the vehicle relative to a geographic frame of reference) and kinodynamic parameters of the vehicle (e.g. speed, acceleration, pose (pitch, yaw, roll), engine RPM, throttle position, brake position, and transmission gear ratio, among other things). Generally, the term kinodynamics relates to a class of problems, in robotics and motion planning, in which velocity, acceleration, force/torque bounds must be satisfied and where kinematics constraints (e.g., obstacle avoidance) must also be satisfied. Kinodynamic parameters are those parameters, such as described above, that are relevant to this type of motion planning problem.

In this regard, the vehicle sensor system 110 may for example include radar unit 112, a Lidar unit 114, a camera 116, a global positioning system (GPS) unit 118, and vehicle sensors 119. Vehicle sensors 119 may include sensors for collecting information about kinodynamic parameters of the vehicle 100 of the vehicle 100 and providing sensor data representative of the kinodynamic parameters of the vehicle 100, including for example sensors for sensing steering angle, linear speed, linear and angular acceleration, pose (pitch, yaw, roll), compass travel direction, vehicle vibration, throttle state, brake state, wheel traction, transmission gear ratio, cabin temperature and pressure, as well as external environment sensors for sensing things such as an external temperature and pressure, precipitation, and noise, among other possibilities.

ADA 105 is a software agent (e.g. a computer program) that comprises instructions that are executed by one or more dedicated processing units or one or more general processing units of the vehicle 100, and may include any number of independent or interconnected sub-agent modules. In various examples, ADA 105 may be implemented using one or more rules-based modules, machine learning-based modules, or combinations of rules-based modules and learning-based modules. Rule-based modules are modules which can be implemented using rules-based algorithms. Machine learning-based modules are modules that are generated or built using machine learning algorithms and training samples. For example, the machine learning-based modules are built or generated using machine learning algorithms such as deep learning algorithms or reinforcement learning algorithms.

Although ADA 105 can take many different forms, in the illustrated example of FIG. 1, ADA 105 is shown as including at least two logical sub-agent modules, namely state estimation system 120, and action selection system 135. The state estimation system 120 receives sensor data from the sensor system 110 and uses the sensor data to generate an estimated vehicle state S={$S_e$, $S_o$, $S_v$}. For example, sensor data received from the radar, Lidar and camera units 112, 114, 116 and other sensors may be used to determine the environment for the space within which the vehicle 100 operates in (e.g., any immediately surrounding stationary obstacles, lanes and lane boundaries, and traffic lights/signs, among other things) and the presence and behavior of other moving objects (e.g. a pedestrian or another vehicle). Sensor data from GPS unit 118 and other vehicle sensors 119 may be used to determine a geographic position of the vehicle 100. Sensor data from vehicle sensors 119 and GPS unit 118, as well as sensor data from other sensor units, may be used to determine vehicle kinodynamic parameters, including speed and pose of the vehicle 100 relative to a frame of reference.

The action selection system 135 receives real-time estimated vehicle state from the state estimation system 120, and selects one or more actions required to meet a target objective (Objective) from the planning system 130. The vehicle control system 140 serves to control operation of the vehicle 100 based on the selected actions provided by the action selection system 135. The vehicle control system 140 may be used to provide full, partial or assistive control of the vehicle 100. The electromechanical system 150 receives control signals from the vehicle control system 140 to operate the mechanical and/or electromechanical components of the vehicle 100 such as an engine, transmission, steering system and braking system.

Figure 2:
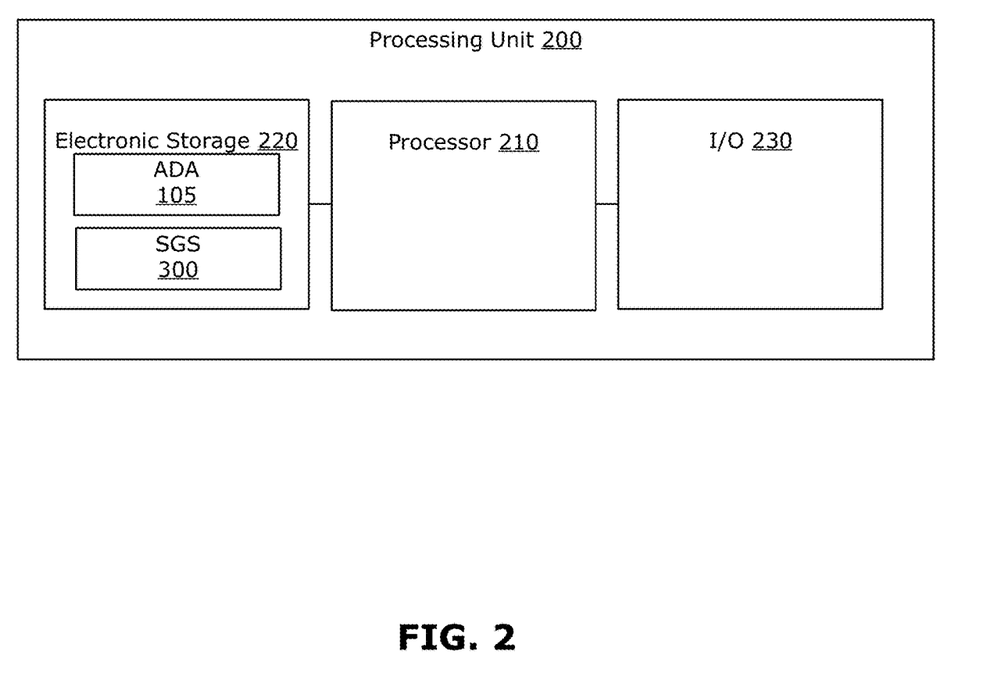
FIG. 2 is block diagram illustrating some components of a processing unit that may be used to implement agents or systems.

As noted above, ADA 105 may be implemented, at least in part, in one or more processing units. By way of example, FIG. 2 shows illustrates an example of a processing unit 200 that includes one or more physical processors 210 (e.g., a microprocessor, graphical processing unit, digital signal processor or other computational element) coupled to electronic storage 220 and to one or more input and output interfaces or devices 230. The electronic storage 220 can include non-transitory memory (for example flash memory) and transitory memory (for example RAM). The non-transitory memory(ies) may store instructions, data and/or software modules for execution by the processor(s) 210 to carry out the functions of the systems described herein. The non-transitory memory(ies) of electronic storage 220 may store other software instructions and data for implementing other operations of the vehicle 100. Electronic storage 220 may include any suitable volatile and/or non-volatile storage and retrieval device(s), including for example flash memory, random access memory (RAM), read only memory (ROM), hard disk, optical disc, subscriber identity module (SIM) card, memory stick, secure digital (SD) memory card, and other state storage devices. In the example of FIG. 2, the electronic storage 220 of processing unit 200 stores instructions and data that enable the processer 210 to implement ADA 105. The instructions stored in electronic storage 200, when executed by the processor 210, cause the processor 210 to implement the ADA 105. In some example, processing unit 200 could be configured as multiple virtual machines that are each configured to implement respective modules.

As noted above, it is critical that when an autonomous vehicle is released into real world situations that the vehicle's autonomous driving agent has been fully evaluated in a number of different scenarios in order to ensure that the vehicle 100 will perform safely in all real world scenarios that it can reasonably be expected to encounter. This disclosure focuses a system and method for generating adversarial scenarios for evaluating and improving agents such as ADA 105. An adversarial scenario is a scenario where the ADA 105 cannot satisfactorily perform in it. In other words, an adversarial scenario is a scenario where the ADA 105 select action(s) that cause the vehicle 100 to not operate safely in the scenario. The performance is measured with different metrics as described.

A scenario is effectively a set of data that simulates the experience that ADA 105 would undergo operating in a real word scenario over a time duration. In this regard, one component an evaluation scenario is the generation of data that simulates the sensor data representative of the collected information that ADA 105 would receive from the sensor system 110 over a period of time during a real world scenario. In example embodiments, a set of parameters is used to define one or more features of an evaluation scenario. Performance of the ADA 105 is measured for the evaluation scenario, and as the performance of the ADA 105 improves, the parameters that define the evaluation scenario are changed to generate new evaluation scenarios that are more difficult for the ADA 105. Accordingly, new evaluation scenarios are generated that take into account the past performance of the ADA 105 in respect of existing evaluation scenarios.

Although a scenario can be parametrized in a number of different ways, in some example embodiments, two sets of parameters are used to define evaluation scenarios. One set of parameters includes environmental parameters ($P_{env}$), which may for example correspond generally to the state properties noted above in respect of vehicle environment ($S_e$). For example, the environmental parameters (EP) of a scenario can define road layout (e.g. roads, road lanes, lane boundaries, intersections); presence of stationary objects and characteristics of those object (e.g. curbs, road barriers, traffic signs, traffic lights; road conditions (e.g. wet, dry, icy); ambient lighting conditions (e.g. light, dark); weather conditions (e.g. sunny, raining, snowing, overcast) and temperature.

A second set of parameters includes non-player characters' (NPCs) policy parameters ($P_{npp}$). The NPC policy parameters $P_{npp}$ define the behavior for each NPC, and include parameters which correspond generally to the vehicle state properties noted above in respect of other moving objects ($S_o$) in the scenario. The NPC policy parameters $P_{npp}$ include parameters that are defined for each NPC individually. For example, the NPC policy parameters $P_{npp}$ can define the behavior of moving objects other the autonomous vehicle, such as other motorized vehicles, bicycles, pedestrians, and animals.

Figure 3:
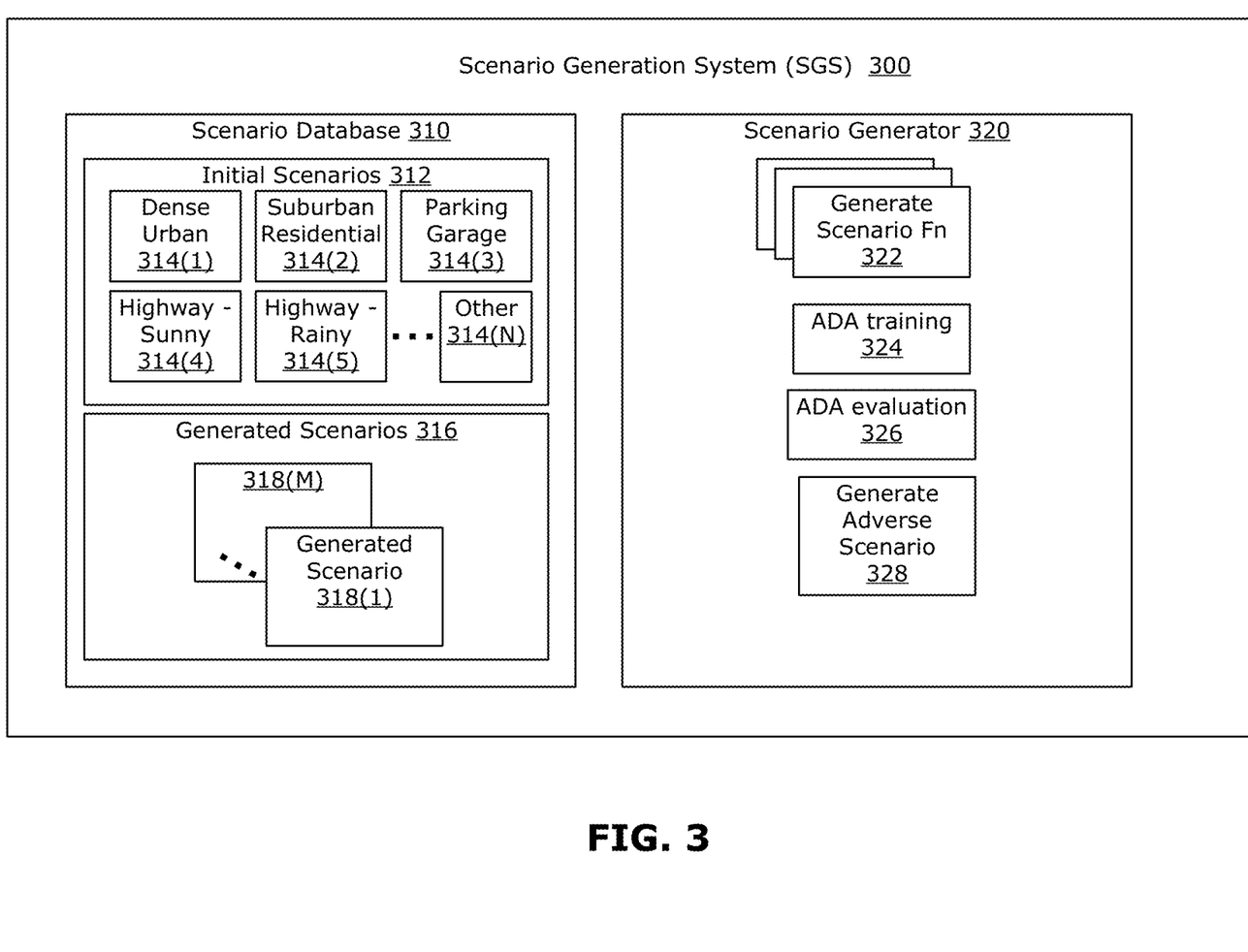
FIG. 3 is a block diagram showing logical components of a scenario generation system according to an example embodiment.
Figure 4:
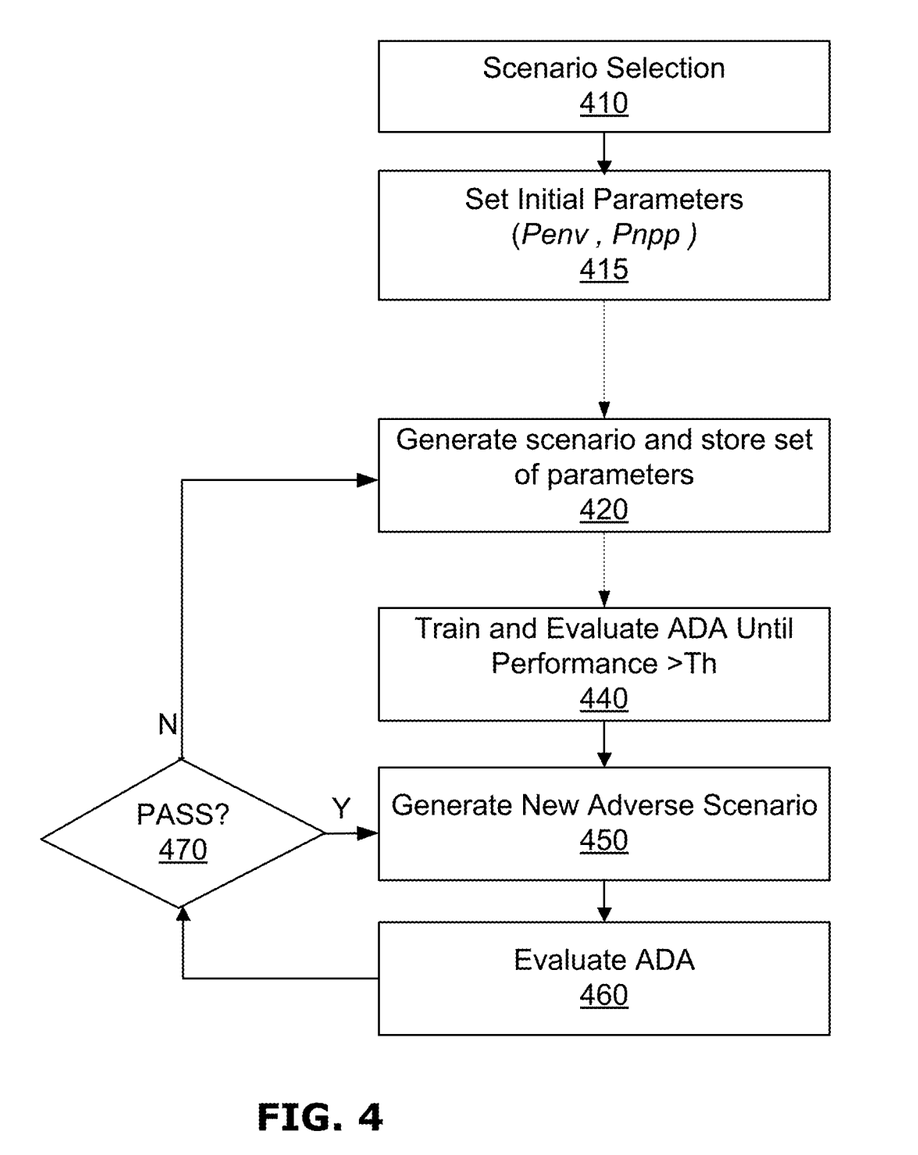
FIG. 4 is a flow diagram representing a scenario generation method according to example embodiments.

FIG. 3 shows logical components of an example of a scenario generation system (SGS) 300 according to example embodiments. SGS 300 includes a scenario database 310 that includes an initial scenarios library 312 that stores information for a set of baseline or initial scenarios 314(1) to 314(N) (generically referred to as initial scenario(s) 314) and a generated scenarios library 316 that stores information about generated scenarios 318(1) to 318(M) (generically referred to as generated scenario(s) 318). SGS 300 also includes a scenario generator 320 that is configured to produce generated scenarios 318. FIG. 4 is a flow diagram illustrating actions taken by scenario generator 320 according to example embodiments. In example embodiments, SGS 300 may be implemented on a processor unit such as processor unit 200 described above. In some examples, the scenario database 310, in addition to or instead of storing actual scenarios, may store the set of parameters used to generate the respective scenarios. For example, instead of storing the actual initial scenarios 314(1) to 314(N), the initial scenarios library 312 may store the respective sets of parameters (also referred to as sets of initial parameters) that are used to generate the initial scenarios 314(1) to 314(N). Similarly, instead of storing the actual generated scenarios 318(1) to 318(M), the generated scenarios library 316 may store the respective sets of parameters (also referred to as sets of generated parameters) used to generate the generated parameters 318(1) to 318(M). Storing the set of parameters that is used to generate a given scenario, instead of storing the scenario itself, may require fewer memory resources and may be a more efficient use of resources. Further, storing the set of parameters may facilitate changing of the parameter values in order to generate more challenging scenarios, as discussed further below.

The baseline or initial scenarios 314(1) to 314(N) provide base scenario data that the scenario generator 320 can build on to produce generated scenarios 318. In this regard, the initial scenarios 314(1) to 314(N) may include copies of or links to existing scenario data. Such data could for example include one or more of image data obtained by the camera unit 112, point cloud data obtained by the Lidar unit 114, radar data obtained by the radar unit 116, and road layout data obtained by the sensor system 110 when the vehicle 100 is operated in a real world setting in a data collection mode. In alternative embodiments, scenario data may be generated by a simulated data generation system. In example embodiments, at least a subset of the scenario environmental parameters ($P_{env}$) are predefined and some of the NPC policy parameters ($P_{npp}$) may be predefined and included in the respective set of initial parameters that are stored and used to generate the initial scenarios 314(1) to 314(N).

As shown in FIG. 3, in some examples the initial scenarios 314(1) to 314(N) (or the corresponding sets of initial parameters) may be categorized into scenario groups. For example, "Dense Urban" category scenario 314(1) could include predefined parameters representing a drive through a downtown dense road metropolitan area; and "Suburban Residential" category scenario 314(2) could include predefined parameters representing a drive through a suburban residential neighborhood complete with school and park zones. As represented in FIG. 3 the degree of specificity (which may for example be proportional to the number of parameters predefined for a particular scenario) may vary among the initial scenarios 314(1) to 314(N). For example, there could be multiple highway category scenarios each having data representing different weather conditions as illustrated by "Highway—Sunny" category scenario 314(4) and "Highway—Rainy" category scenario 315(5).

The flowchart in FIG. 4 illustrates an example method for generating new adverse scenarios and training the ADA 105. In the example of FIG. 4, the ADA 105 may have been pre-trained or partly-trained beforehand to learn a policy of the ADA 105. For example, the ADA 105 may have been pre-trained using a sample of previously-generated scenarios from the generated scenarios library 316. Using the example method of FIG. 4, the pre-trained ADA 105 may be further trained on more challenging adverse scenarios to update the learned policy of the ADA 105. In other examples, pre-training of the ADA 105 may take place as part of the example method (e.g., using initial scenario parameters as discussed below), and further training of the pre-trained ADA 105 is performed as part of the method.

Referring to FIG. 4, in example embodiments, the scenario generation begins with the selection (operation 410) of one of the initial scenarios 314(1)-314(N) (or the corresponding set of initial parameters) from the initial scenarios library 312. In some examples, the selection (operation 410) may be specified in an input received by the scenario generator 320 (for example from a human operator), or alternatively, the selection (operation 410) may be performed by the scenario generator 320. An initial set of parameters comprising initial environment parameters and initial policy parameters (Penv, Pnpp) are then selected as required (operation 415) for generating a new scenario. In this regard, at least some of the initial environmental parameters (Penv) and possibly some of the policy parameters (Pnpp) included in the initial set of parameters will be predetermined based on the selected initial scenario 314 (e.g., predetermined by the set of initial parameters retrieved from the initial scenarios library 312), however at least some of the initial parameters included in the set of initial parameters may need to be initialized in order to configure generation of the new scenario. By way of example, in the case of "Highway—Sunny" scenario 314(4), policy parameters (Pnpp) that require initialization may include parameters that specify: how many other vehicles are located in an operating space of the vehicle 100 (num_vehicles); how often the other vehicles change lanes (change_lane_frequency); speeds of the other vehicles (speed_y); distance thresholds relative to other vehicles (vertical_distance_threshold and change_lane_threshold). Environmental parameters (Penv) that require initialization may include parameters that specify: width of the highway lanes (lane_width), and number of highway lanes (number_of_lanes).

The initial set of parameters are then used to generate a new scenario 318(1) (operation 420), and the set of parameters are stored in the generated scenarios library 316. In example embodiments, the scenario generator 320 includes a generate scenario function 322 that is called on in operation 420. In particular, the generate scenario function 322 may be configured to generate, for the new scenario 318(1), a set of scenario parameters for a scenario duration that has a length corresponding to defined number of time-steps $t_0$ to $t_{end}$. Each scenario parameter of the set of scenario parameters can be changed or varied. In at least some examples, scenario generator 320 may include a plurality of generate scenario functions 322, each of which is uniquely configured to vary a respective scenario parameter included in the set of scenario parameters.

Figure 5:
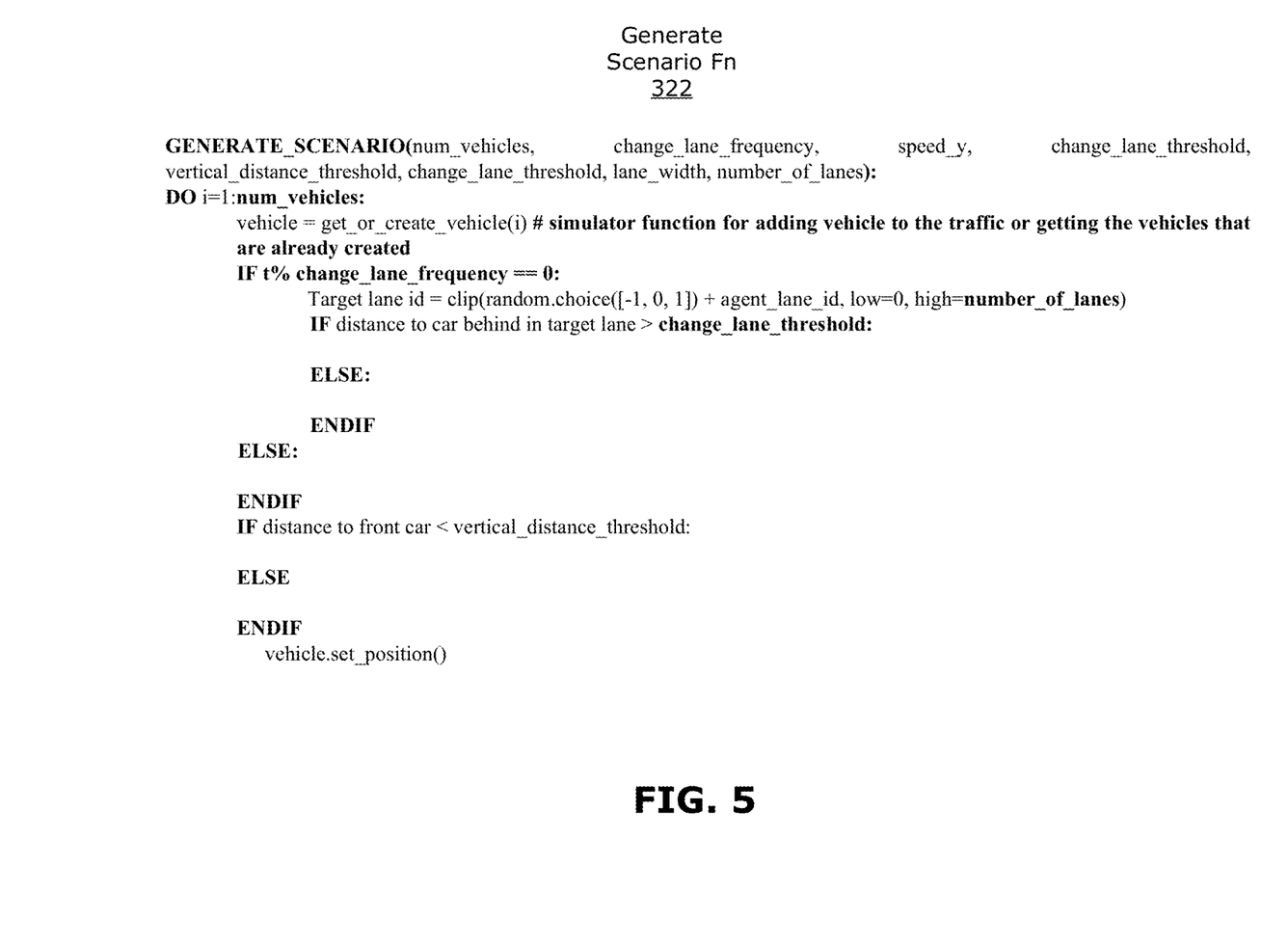
FIG. 5 is a pseudo-code representation of a scenario generation function of a scenario generator of the system of FIG. 3.
Figure 6:
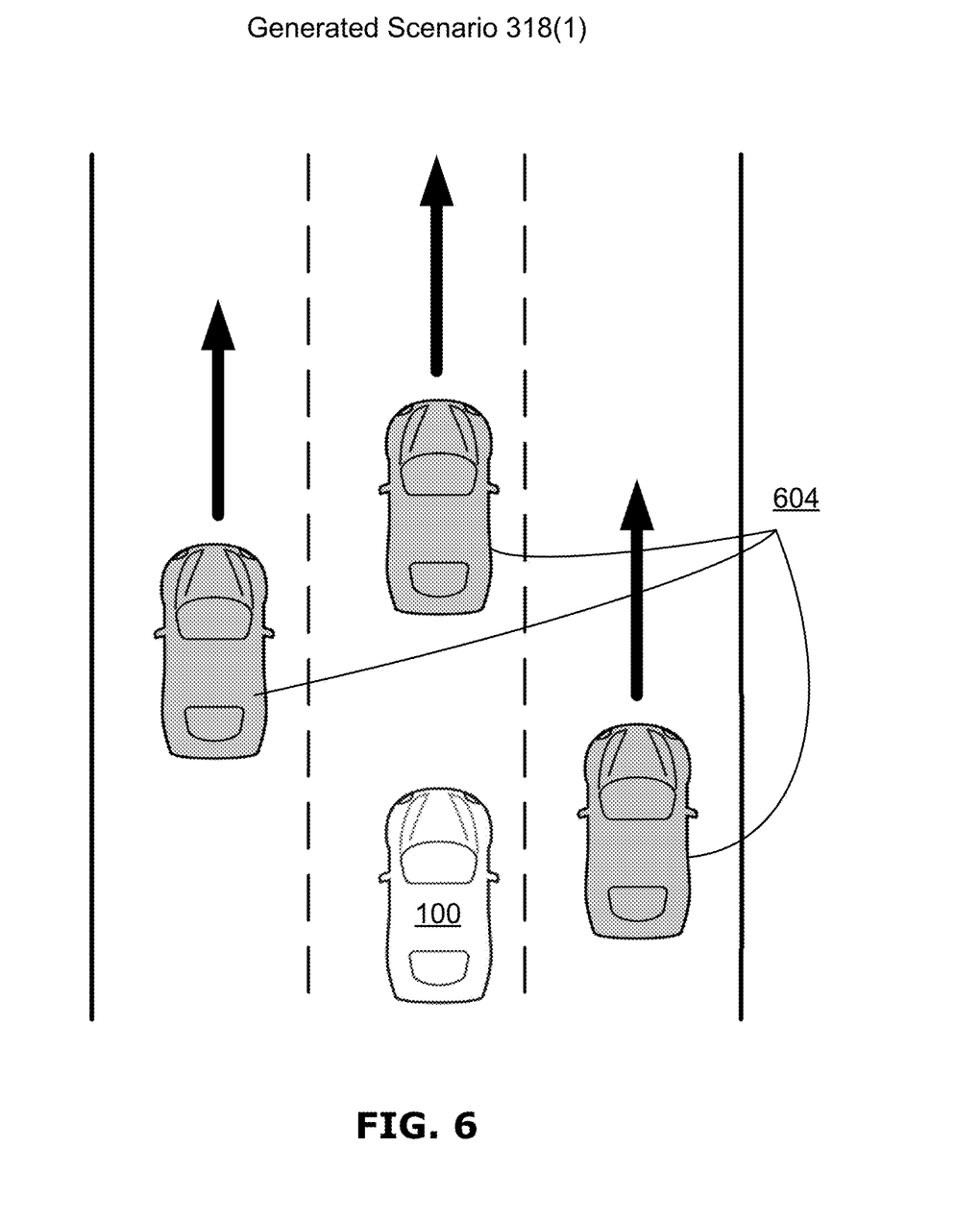
FIG. 6 is a graphical plan representation of a scenario.

For explanatory purposes, a pseudo code representation of a generate scenario function 322 is shown in FIG. 5, and a graphical representation of a time-step t of the scenario 318(1) generated by the function is shown in FIG. 6. In the illustrated example, the category scenario is "Highway—Sunny" and is based on the initial category scenario "Highway—Sunny" 314(4), which was selected in operation 410. In this example, the set of initial parameters in Action 415 includes: (num_vehicles, change_lane_frequency, speed_y, change_lane_threshold, vertical_distance_threshold, change_lane_threshold, lane_width, number_of_lanes), and each of the parameters in the set of initial parameters are passed to the generate scenario function 322 in operation 420. As represented in FIGS. 5 and 6, the generate scenario function 322 in this example generates scenario parameters that include NPC policy parameters $P_{npp}$ which define the behavior of a plurality of NPCs 604, such as other vehicles, that share a multi-lane highway with the vehicle 100. The scenario policy parameters may be generated to define a series of way points and speeds for the NPCs 604 for a duration of the scenario (time-steps $t_0$ to $t_{end}$). The scenario parameters that define the scenario 318(1) are stored in scenario database 310 (operation 420).

In at least some example embodiments, the scenario generator 320 may call on a number of different generate scenario functions 322 that each provide a respective set of scenario parameters for the scenario 318(1).

One or more stored scenarios (or corresponding stored sets of parameters) are sampled from the scenario database 310 (e.g., including the newly generated scenario 318(1)). The sampled scenario(s) are used to train the ADA 105 modify or update its learned policy. The trained ADA 105 (e.g., the learned policy of the ADA 105) is then evaluated on its performance, using scenario(s) from the scenario database 310. The scenario(s) used for training the ADA 105 and the scenario(s) used for evaluating the ADA 105 may be different. For example, the stored scenarios (or corresponding stored sets of parameters) may be tagged or otherwise indicated as being training scenarios or evaluation (or non-training) scenarios. The scenario(s) sampled for training the ADA 105 may be sampled from only those scenarios that have been indicated as being training scenarios. Evaluation of the trained ADA 105 may then be carried out using scenario(s) that may be sampled from only the non-training scenarios, or that may be sampled from both the training scenarios as well as the non-training scenarios (optionally with weighting to adjust the ratio of training scenarios to non-training scenarios in the sample). In some examples, the stored scenarios may not be categorized as training or non-training. The ADA 105 may be trained using sampled scenario(s), and evaluation of the trained ADA 105 may be done using the sampled scenario(s) with added noise (or other added variation). The training and evaluating is repeated until the ADA 105 performance meets or exceeds a threshold (Th) (operation 440).

The scenario(s) sampled from the scenario database 310 may or may not include the newly generated scenario 318(1). For example, the scenario database 310 may be sampled by receiving from the scenario database 310 a predefined number of stored scenarios (or corresponding stored sets of parameters) that fit the scenario category. Sampling from the scenario database 310 may be carried out using various suitable sampling methods. For example, uniform sampling, weighted sampling or sampling based on a distribution may be used. The sampled scenario(s) may be selected to be suitably challenging. For example, evaluation of the trained ADA 105 may generate a performance metric representing the performance of the trained ADA 105. The sampling technique may use the performance metric (e.g., as a weight) to obtain samples from the scenario database 310. For example, the performance metric may indicate the ADA 105 has poor performance associated with a particular parameter (or particular value(s) of a parameter). The sampling methods may then obtain samples from the scenario database 310 that targets that particular parameter (e.g., selecting samples that challenge the ADA 105 over a full range of possible values for that parameter). In example embodiments, scenario generator 320 includes an ADA training function 324 and an ADA evaluation function 326

Figure 7:
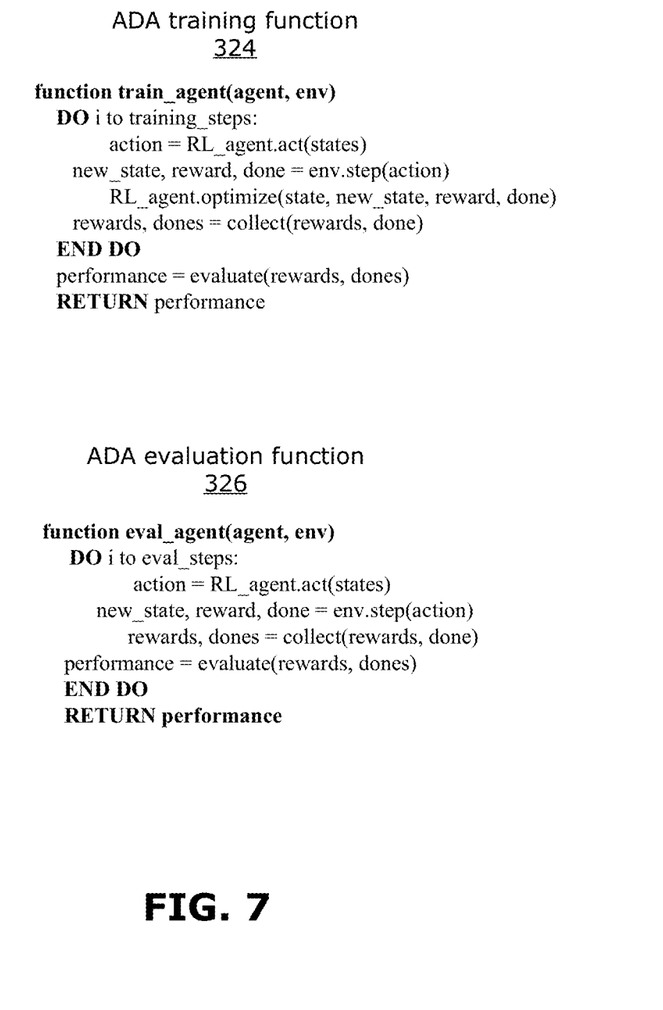
FIG. 7 is a pseudo-code representation of a training function and an evaluation function of the scenario generator of the system of FIG. 3.

(see FIG. 3) that are called to implement operation 440. Although ADA training function 324 and ADA evaluation function 326 can each be implemented in a number of different ways, FIG. 7 illustrates pseudo-code representations of possible ADA training function 324 and ADA evaluation function 326 implementations.

ADA training function 324 is configured to train the ADA 105 to modify or update its learned policy until the ADA 105 can select actions to perform in the sampled scenario(s) that cause the vehicle 100 to operate safely. The actual form of this training can be dependent on the configuration of the ADA 105. The pseudo-code version of ADA training function 324 in shown in FIG. 7. The pseudo-code version of ADA training function 324 represents training of an ADA 105 to modify or update the learned policy of the ADA 105 using reinforcement learning. However, it will be appreciated that the ADA training function 324 may use other machine learning techniques or methods to update or modify the learned policy of the ADA 105, for example supervised learning techniques or methods. In such a case, the set of sampled scenario(s), including the newly generated scenario 318(1), is treated as a training data for the ADA 105.

To train the ADA 105, sampled scenarios (including the newly generated scenario 318(1)) may be converted to appropriate inputs accepted by the ADA 105. For example, the ADA 105 expects to receive a target objective and sensor data, as discussed above. Accordingly, the scenario parameters may be used in a simulator to simulate the sensor data and the objective that would be generated, and this may be the input provided as training data to the ADA 105. The ADA 105 may also be trained by training the action selection system 135 directly, for example by simulating a vehicle state from the sampled scenario and providing that as training data for the action selection system 135.

The ADA 105 is evaluated based on the performance of the vehicle 100 when controlled according to the ADA 105. Thus, to evaluate the ADA 105, the selected actions generated by the ADA 105 may be used to simulate a resultant state of the vehicle 100, and that state may be evaluated.

In some examples ADA 105 may be implemented using rules-based programming, and training ADA 105 may be performed by modifying programming, rules used by the ADA 105 to enable the ADA 105 to adequately perform in the context of the sampled scenario(s).

Upon the completion of training by ADA training function 324, the ADA evaluation function 326 is used to test the resulting trained ADA 105 to determine if the trained ADA 105 can perform in the sampled scenario(s) adequately. In example embodiments, the selected actions to achieve the target objective output of the trained ADA 105 is evaluated using the set of sampled scenario(s) as an evaluation data set to determine if one or more performance thresholds are reached. By way of example, vehicle control signals corresponding to the selected actions output by the trained ADA 105 could be monitored by a driving simulator in the context of the sampled scenario(s) to determine performance metrics such as number of collisions, average speed, agent vehicle pose, mean time between specified events, etc. Training of the ADA 105 to modify or update its learned policy and evaluation of the trained ADA 105 using the sampled scenario(s) continues until the performance, as measured by one or more selected performance metrics, exceed one or more performance thresholds Th.

Figure 8:
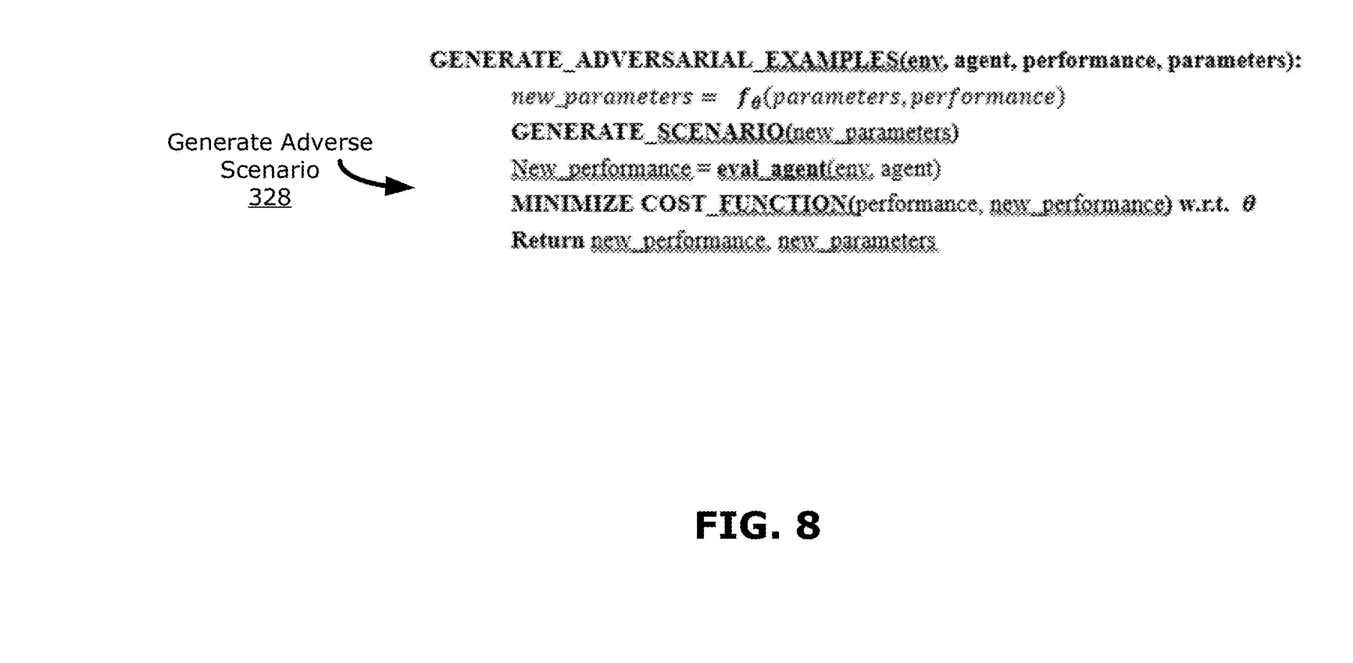
FIG. 8 is a pseudo-code representation of an adversarial scenario generation function of the scenario generator of the system of FIG. 3.

Once the trained ADA 105 has demonstrated that it can successfully handle the sampled scenario(s), the scenario generator 320 is configured to generate adverse scenarios of increasing difficulty as follows. As indicated in operation 450, a new adverse scenario is generated. In example embodiments, scenario generator 320 calls on generate adverse scenario function 328 (see FIG. 3). A pseudo-code representation of generate adverse scenario function 328 is shown in FIG. 8 according to one example embodiment. As shown in FIG. 8, generate adverse scenario function 328 calls on generate scenario function 322 and evaluate ADA function 326 to generate new scenario parameters (new_parameters).

As indicated by operation 460, the trained ADA 105 is evaluated on the new scenario as defined by the set of parameters of the new scenario to determine if the ADA 105 can satisfactorily perform the new scenario as indicated by the comparison of one or more measured metrics against one or more performance thresholds (which may include a different threshold than threshold Th used to evaluate performance of the initial scenario in operation 440). As indicated in decision block 470, if the ADA 105 passes the evaluation (i.e. performance meets or is greater than threshold), then the newly generated adverse scenario is deemed to be too simple (i.e. not adverse enough) to be used to generate a training sample for further training of the ADA 105 to improve the performance of ADA 105 and is discarded. The scenario generator 320 repeats the operations 450, 460 of generating and evaluating new adverse scenarios with changes to the scenario parameters until a scenario is generated that causes the ADA 105 to fail in its performance of the scenario (i.e., does not pass at decision block 470). The failure causing adverse scenario is deemed suitable for use in improving the ADA 105, and accordingly the scenario parameters for the failure causing adverse scenario is stored as a new generated scenario 318(2) in the generated scenarios library 316 (operation 420). The newly generated adverse scenario (or the corresponding set of parameters) can then be included in the sampled scenario(s) that are used to further train the ADA 105 to update or modify its learned policy, until the ADA 105 can satisfactory perform the sample scenario(s) (including the newly generated adverse scenario 318(2)) (operation 440). The cycle of generating further adverse scenarios can continue, wherein each subsequently generated adverse scenario is influenced by the previously generated scenarios. The generating of new adverse scenarios and further training of the ADA 105 may end when the ADA 105 is considered to be sufficiently trained on a sufficient number of adverse scenarios. For example, the method of FIG. 4 may end when a predetermined number of cycles has been performed.

The ADA 105, trained on the generated adverse scenarios, may be used in the vehicle 100, for performance in the real-world. In other cases, the ADA 105 may be further trained using other training techniques.

In example embodiments, the scenario generator 320 generates a new scenario by changing the parameters of a scenario at specific rates and constraints (which may be predefined in order to keep the scenarios realistic) to degrade the ADA's performance. In general, the new adverse scenario parameters are generated based on the evaluated performance of the trained ADA 105. For example, policy parameters for NPCs can be selected in an active learning way, so as to increase the uncertainty of the policy of the ADA 105. A new scenario with new parameters (which can include new environmental parameters, new NPC policy parameters, or both) can then be used as the training set for further training the ADA 105 to modify or update the policy of the ADA 105. For example, a numerical parameter may be changed progressively or systematically, such as by gradually increasing or decreasing the parameter value, or by using a gradient function. As the ADA 105 performs each scenario, the impact of a given parameter change on the ADA performance can be used as a basis for determining a direction (e.g., increase or decrease) for changing a parameter in order to challenge the ADA 105—that is, changing the parameter in a direction that is expected to worsen performance of the ADA 105. In some examples, an optimization algorithm (e.g., Bayesian Optimization) may be used to change a given parameter value in order to challenge the ADA 105. The optimization algorithm may be used to change the parameter in such a way that the performance of the ADA 105 is expected to worsen. In some examples, a sampling technique (e.g., Monte Carlo sampling) may be used to change a given parameter value.

There may be one or more predefined constraints in changing a parameter, so that the changed parameter is within the boundaries of a realistic driving scenario. A parameter value may also be changed based on empirical rules. For example, a parameter may be non-numerical (e.g., categorical parameter), and it may be more suitable to use a rule (e.g., rainy conditions are more challenging than sunny conditions) instead of a gradient to determine how to change such a parameter. Other methods may be used to generate new scenario parameters, so as to challenge the ADA 105.

The method of FIG. 4 may be performed by the SGS 300, which may be implemented using the processing unit 200 as shown in FIG. 2. In the sample of FIG. 2, the SGS 300 and the ADA 105 are shown as being both implemented within the same processing unit 200 (which may in turn be implemented in the vehicle 100). In other examples, the SGS 300 and the ADA 105 may be implemented using separate processing units. For example, the ADA 105 may be implemented using the processing unit 200 of the vehicle 100, and the SGS 300 may be implemented using a different processing unit that may be external to the vehicle 100. For example, the SGS 300 may be implemented in a workstation, in which case scenario generation and training of the ADA 105 on the generated scenarios may take place outside of the vehicle 100.

Figure 9:
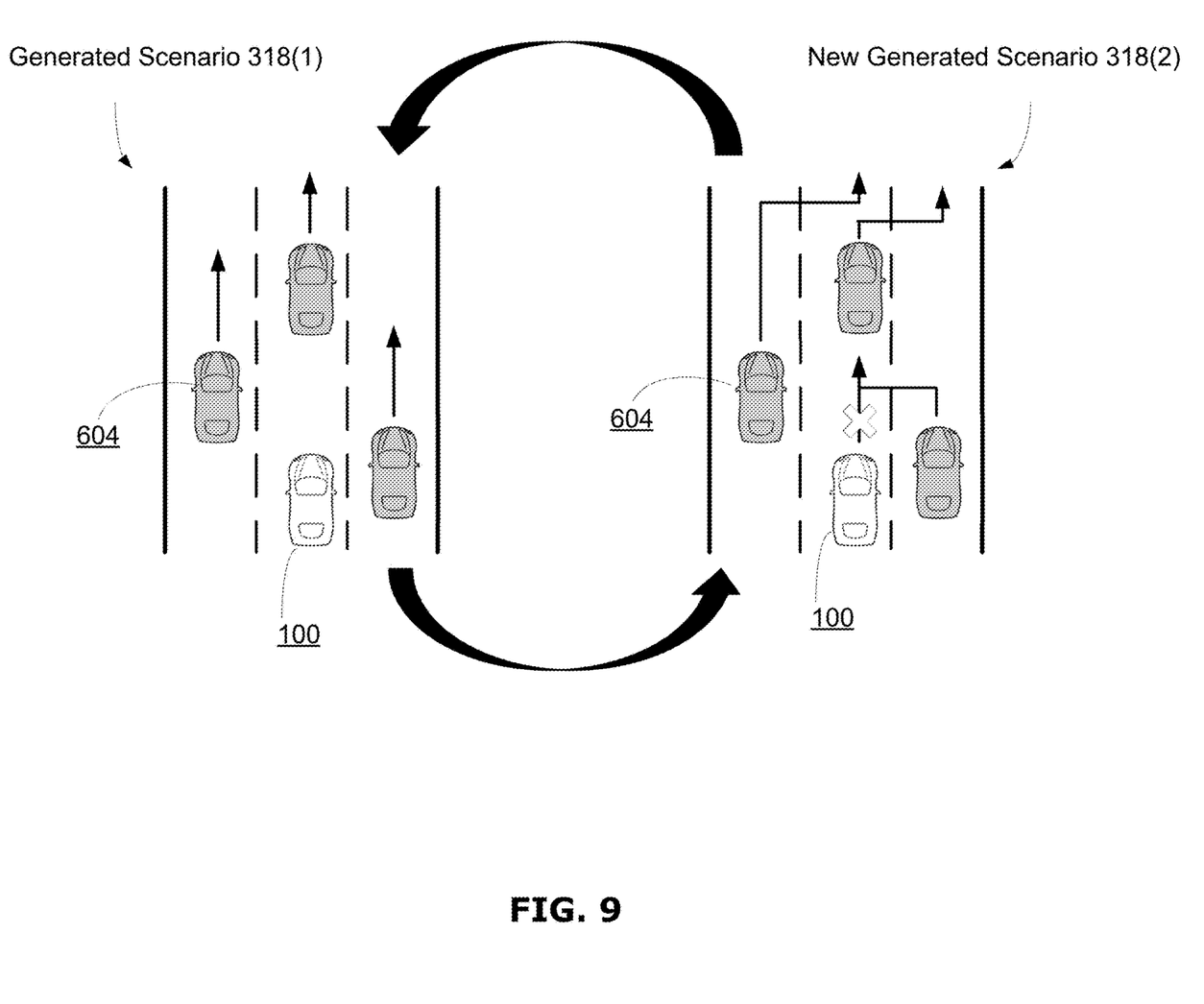
FIG. 9 is a graphical plan representation of a further scenario based on the scenario of FIG. 6.

FIG. 9 graphically illustrates the increasing difficultly of generated scenarios. The left side of FIG. 9 illustrates a first generated scenario 318(1) as discussed above in respect of FIG. 6. As discussed above, the generated scenario 318(1) includes non-player characters (NPCs) 604 (e.g. other vehicles) that share a multi-lane highway with the vehicle 100. The right side of FIG. 9 illustrates a subsequent adverse generated scenario 318(2). The policy parameters of the NPCs 604 for the new generated scenario 318(2) define new waypoints that result in a much greater number of lane changes of the NPCs 604, with much smaller vertical distances between the NPCs 604 and the vehicle 100. Thus, the right side scenario is more difficult for the ADA 105 of the vehicle 100.

Thus, in example embodiments, as the ADA 105 gets better at initial testing scenarios, the scenario generator 320 starts to change the scenario parameters. There may be one or more pre-defined constraints to how the scenario parameters may be changed by the scenario generator 320 (e.g. social vehicle cannot drive backward with fast speed). These constraints can be applied as a set of hard rules, or in cases where the other NPCs are defined by respective NPC algorithms, the constraints can be applied in algorithm level (which can allow an option of breaking rules with some probability as it happens in real world). The performance of the ADA 105 is measured with respect to the changes in scenario parameters. For example, as the speed of other cars is increased, or as pedestrians start to have more unpredictable actions, the ADA 105 starts to fail more. As the ADA 105 starts to fail more the ADA 105 also actively learns about the new scenarios and starts to get better at handling them. At the same time, the scenario generator 320 makes the scenarios harder by changing the parameters. The direction of changes (gradient) in parameters of scenarios may be automatically determined based on how each parameter affects the performance of the ADA 105.

In example embodiments, the changes in the parameters are constrained to result in generation of realistic scenarios while avoiding unrealistic scenarios. For example a scenario where all the cars drive backwards on the highway at high speed is unrealistic and not desirable. Avoiding unrealistic scenarios can be handled either by rules or by algorithms (e.g. in case of generating scenes for rainy weather condition a generator/discriminator setting may help to make sure that the generated scenario is realistic).

In various examples, aspects of scenario generator 320, including at least some of the functions 322, 324, 326 and 328, may be implemented using one or more rules-based modules, machine learning-based modules or combinations of rules-based modules and machine learning-based modules. The machine learning-based modules may be built or generated using machine learning algorithms and training samples. Examples of machine learning-based algorithms that may be used to build or generate machine learning-based modules include Bayesian algorithms, generative algorithms, supervised algorithms, Gaussian processes, deep learning based algorithms and gradient descent/ascent algorithms, among other possibilities.

Although scenario generation, training and evaluation as described above contemplates an end-to-end global training and evaluation of ADA 105, as previously noted in the above description of ADA 105 in the context of FIG. 1, the ADA 105 may include several independent rules-based and/or learning-based functions and modules (e.g. systems 120, 130, 140). Accordingly, in some examples, training and evaluation of ADA 105 may be focused on selectively training one or more individual sub-system agents of the ADA 105 and specific scenarios 318 may be focused for training specific individual sub-system agents. For example, scenarios could be generated that are targeted for specifically training a Lidar point cloud analysis sub-system agent of the state estimation system 120 to detect object boundaries. In such a case, the training and evaluation may be performed on just the Lidar point cloud analysis sub-system agent.

The present disclosure describes examples in which scenarios (or corresponding sets of parameters) are stored in and retrieved from the scenario database 312. However, it should be understood that in other examples scenarios may not be stored in a database. For example, scenarios may be stored in a cloud, in temporary memory or in a hard drive instead of a database. In other examples scenarios may be generated on-the-fly instead of being stored and retrieved. It should be understood that the location of storage, and whether the scenarios are stored or only temporary, are variations within the scope of the present disclosure.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for training an autonomous driving agent for an autonomous vehicle using one or more sets of parameters, each set of parameters defining a respective driving scenario for the autonomous vehicle, the method comprising:
   generating a new set of parameters defining a new driving scenario that causes worse performance of the autonomous driving agent by:
      determining a gradient, in a first parameter of one of the sets of parameters defining a respective driving scenario, that represents how the first parameter affects performance of the autonomous driving agent in the respective driving scenario; and
      based on the gradient, changing the first parameter in a direction that causes worse performance of the autonomous driving agent, and including the changed first parameter with one or more unchanged parameters of the one set of parameters in the new set of parameters defining the new driving scenario that causes worse performance of the autonomous driving agent;
   evaluating performance of the autonomous driving agent on the new driving scenario;
   repeating the generating and evaluating until the autonomous driving agent fails to satisfy a predefined performance threshold for the new driving scenario, wherein each instance of generating the new set of parameters is based on a prior evaluated performance of the autonomous driving agent; and
   training the autonomous driving agent to update a learned policy of the autonomous driving agent using at least one set of parameters, including the new set of parameters.

2. The method of claim 1, wherein the one or more sets of parameters are stored in a database, the method further comprising:
   after the repeating, storing the new set of parameters parameters in the database.

3. The method of claim 1, wherein the autonomous driving agent is pre-trained using an initial set of parameters defining a sample driving scenario, prior to generating the new set of parameters.

4. The method of claim 1 wherein the autonomous driving agent uses machine learning, and the at least one set of parameters is used as a training dataset for training the autonomous driving agent.

5. The method of claim 1, wherein changing the first parameter comprises changing the first parameter based on one or more predefined constraints.

6. The method of claim 5, wherein at least one of the one or more constraints are applied using a predefined rule or a constrained optimization algorithm.

7. The method of claim 1, wherein changing the first parameter comprises:
   changing the first parameter using an optimization algorithm in order to challenge the autonomous driving agent.

8. The method of claim 1, wherein generating the new set of parameters defining the new driving scenario further comprises:
   determining a gradient, in a second parameter of one of the sets of parameters defining a respective driving scenario, that represents how the second parameter affects performance of the autonomous driving agent in the respective driving scenario; and
   based on the gradient, changing the second parameter in a direction that causes worse performance of the autonomous driving agent, and including the changed second parameter with the changed first parameter and the one or more unchanged parameters of the one set of parameters in the new set of parameters.

9. The method of claim 1, wherein generating the new set of parameters defining the new driving scenario further comprises:
   changing a second parameter of the one set of parameters based on one or more predefined constraints; and
   including the changed second parameter with the changed first parameter and the one or more unchanged parameters in the new set of parameters.

10. The method of claim 1, wherein generating the new set of parameters defining the new driving scenario further comprises:
   changing a third parameter of the one set of parameters using an optimization algorithm in order to challenge the autonomous driving agent; and
   including the changed third parameter with the changed first parameter and the one or more unchanged parameters in the new set of parameters.

11. A processing unit comprising:
   a processor; and
   a memory coupled to the processor, the memory storing machine-executable instructions of an autonomous driving agent for an autonomous vehicle that, when executed by the processor, causes the processing unit to:
      generate a new set of parameters defining a new driving scenario that causes worse performance of the autonomous driving agent by:
         determining a gradient, in a first parameter of one of the sets of parameters defining a respective driving scenario, that represents how the first parameter affects performance of the autonomous driving agent in the respective driving scenario; and based on the gradient, changing the first parameter in a direction that causes worse performance of the autonomous driving agent, and including the changed first parameter with one or more unchanged parameters of the one set of parameters in the new set of parameters defining the new driving scenario that causes worse performance of the autonomous driving agent;

evaluate performance of the autonomous driving agent on the new driving scenario;

repeat the generate and evaluate until the autonomous driving agent fails to satisfy a predefined performance threshold for the new driving scenario, wherein each instance of generating the new set of parameters is based on a prior evaluated performance of the autonomous driving agent; and train the autonomous driving agent to learn a policy of the autonomous driving agent using at least one set of parameters, including the new set of parameters.

12. The processing unit of claim 11, wherein the one or more sets of parameters are stored in a database, and wherein the instructions further cause the processing unit to:
after the repeating, store the new set of parameters in the database.

13. The processing unit of claim 11, wherein the autonomous driving agent is pre-trained using an initial set of parameters defining a sample driving scenario, prior to generating the new set of parameters.

14. The processing unit of claim 11, wherein the autonomous driving agent uses machine learning, and the at least one set of parameters is used as a training dataset for training the autonomous driving agent.

15. The processing unit of claim 11, wherein the instructions further cause the processing unit to change the first parameter by changing the first parameter based on one or more predefined constraints and wherein at least one of the one or more constraints are applied using a predefined rule or a constrained optimization algorithm.

16. The processing unit of claim 11, wherein the instructions further cause the processing unit to change the first parameter by:
changing the first parameter using an optimization algorithm in order to challenge the autonomous driving agent.

17. The processing unit of claim 11, wherein the processing unit is implemented in the autonomous vehicle, and the instructions further cause the processing unit to implement the autonomous driving agent in the autonomous vehicle.

18. The processing unit of claim 11, wherein the instructions further cause the processing unit to generate the new set of parameters defining the new driving scenario by:
changing a second parameter of the one set of parameters based on one or more predefined constraints; and
including the changed second parameter with the changed first parameter and the one or more unchanged parameters in the new set of parameters.

19. The processing unit of claim 11, wherein the instructions further cause the processing unit to generate the new set of parameters defining the new driving scenario by:
changing a third parameter of the one set of parameters using an optimization algorithm in order to challenge the autonomous driving agent; and
including the changed third parameter with the changed first parameter and the one or more unchanged parameters in the new set of parameters.

20. A non-transitory computer-readable medium storing machine-executable instructions of an autonomous driving agent for an autonomous vehicle that, when executed by a processor of a processing unit, causes the processing unit to:
generate a new set of parameters defining a new driving scenario that causes worse performance of the autonomous driving agent by:
determining a gradient, in a first parameter of one of the sets of parameters defining a respective driving scenario, that represents how the first parameter affects performance of the autonomous driving agent in the respective driving scenario; and
based on the gradient, changing the first parameter in a direction that causes worse performance of the autonomous driving agent, and including the changed first parameter with one or more unchanged parameters of the one set of parameters in the new set of parameters defining the new driving scenario that causes worse performance of the autonomous driving agent;

evaluate performance of the autonomous driving agent on the new driving scenario;

repeat the generate and evaluate until the autonomous driving agent fails to satisfy a predefined performance threshold for the new driving scenario, wherein each instance of generating the new set of parameters is based on a prior evaluated performance of the autonomous driving agent; and train the autonomous driving agent to learn a policy of the autonomous driving agent using at least one set of parameters, including the new set of parameters.

* * * * *

UNITED STATES PATENT AND TRADEMARK OFFICE
CERTIFICATE OF CORRECTION

PATENT NO. : 11,036,232 B2
APPLICATION NO. : 16/297973
DATED : June 15, 2021
INVENTOR(S) : Florian Shkurti et al.

It is certified that error appears in the above-identified patent and that said Letters Patent is hereby corrected as shown below:

In the Claims

In Column 16, Line 4 (Claim 2): "after the repeating, storing the new set of parameters" should read -- after the repeating, storing the new set of --.

Signed and Sealed this
Third Day of August, 2021

Drew Hirshfeld
*Performing the Functions and Duties of the
Under Secretary of Commerce for Intellectual Property and
Director of the United States Patent and Trademark Office*